United States Patent [19]
Jester et al.

[11] 3,946,824
[45] Mar. 30, 1976

[54] CHASSIS FOR A VEHICLE WITH LARGE DIAMETER SINGLE FRONT WHEEL

[75] Inventors: Oden Jester; Melvin A. Bergkamp, both of Salina, Kans.

[73] Assignee: Rickel Manufacturing Corporation, Kansas City, Mo.

[22] Filed: May 28, 1974

[21] Appl. No.: 473,770

[52] U.S. Cl. .............................. 180/27; 280/106 R
[51] Int. Cl.² ........................................ B62D 61/08
[58] Field of Search............ 180/27, 26, 26 A, 25 R; 280/106 R

[56] References Cited
UNITED STATES PATENTS

| | | | |
|---|---|---|---|
| 2,177,991 | 10/1939 | Maddock ........................ | 280/106 R |
| 2,192,560 | 3/1940 | Riemenschneider ............ | 280/106 R |
| 2,467,516 | 4/1949 | Almdale ...................... | 280/106 R X |
| 3,135,347 | 6/1964 | Vranyosovics .............. | 280/106 R X |
| 3,438,454 | 4/1969 | Rickel et al ...................... | 180/27 X |
| 3,519,097 | 7/1970 | Commons ......................... | 180/26 R |
| 3,695,374 | 10/1972 | Commons ........................... | 180/27 |
| 3,788,416 | 1/1974 | Sorenson et al ..................... | 180/27 |

*Primary Examiner*—Kenneth H. Betts
*Attorney, Agent, or Firm*—Lowe, Kokjer, Kircher, Wharton & Bowman

[57] ABSTRACT

A chassis for a vehicle having three large diameter, low soil pressure tires includes two elongate linear side rails which diverge from one another from back to front and are spaced far enough apart at the front to house a large engine and more closely at the rear to reduce the wheel span. A special front portion to which the front wheel assembly and associated steering means are mounted is constructed of beam-like members extending forwardly and upwardly from the side rails. The beamlike sides of the front portion are bent to forwardly approach one another, terminating at a bearing which receives a mounting yoke carrying the front tire.

6 Claims, 7 Drawing Figures

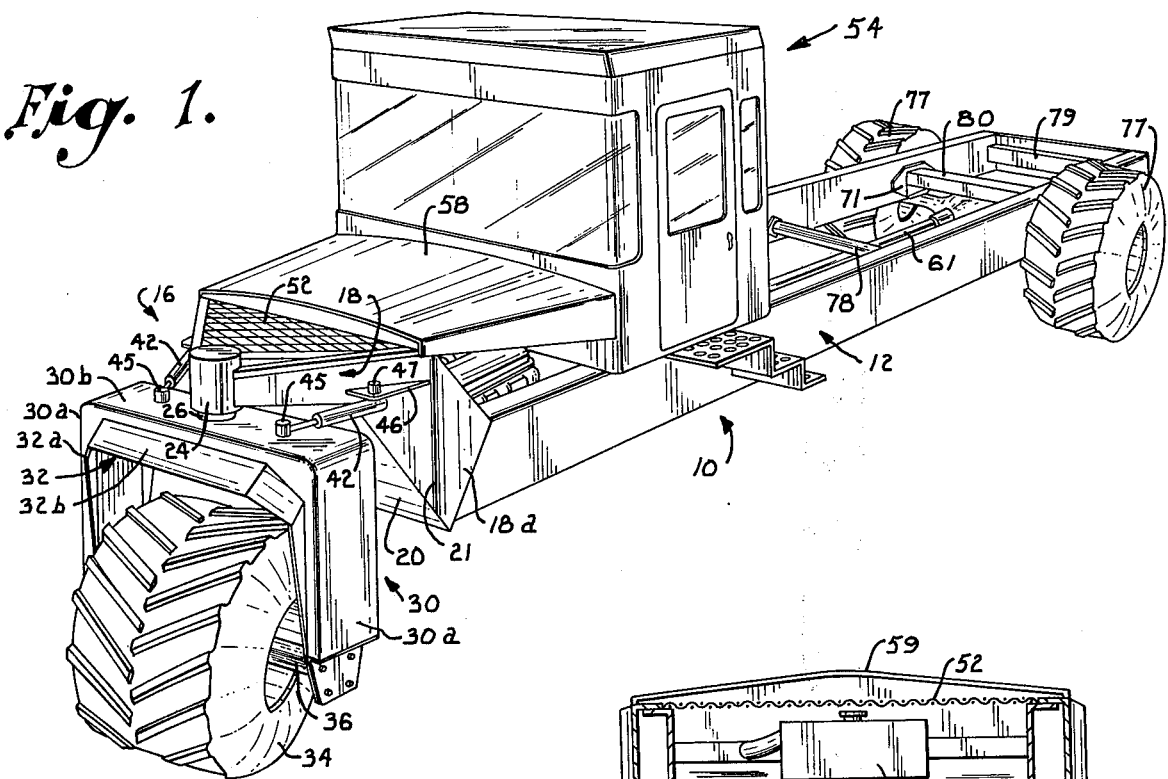
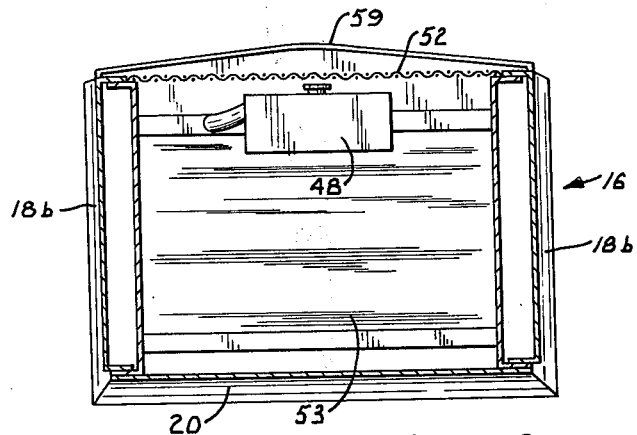
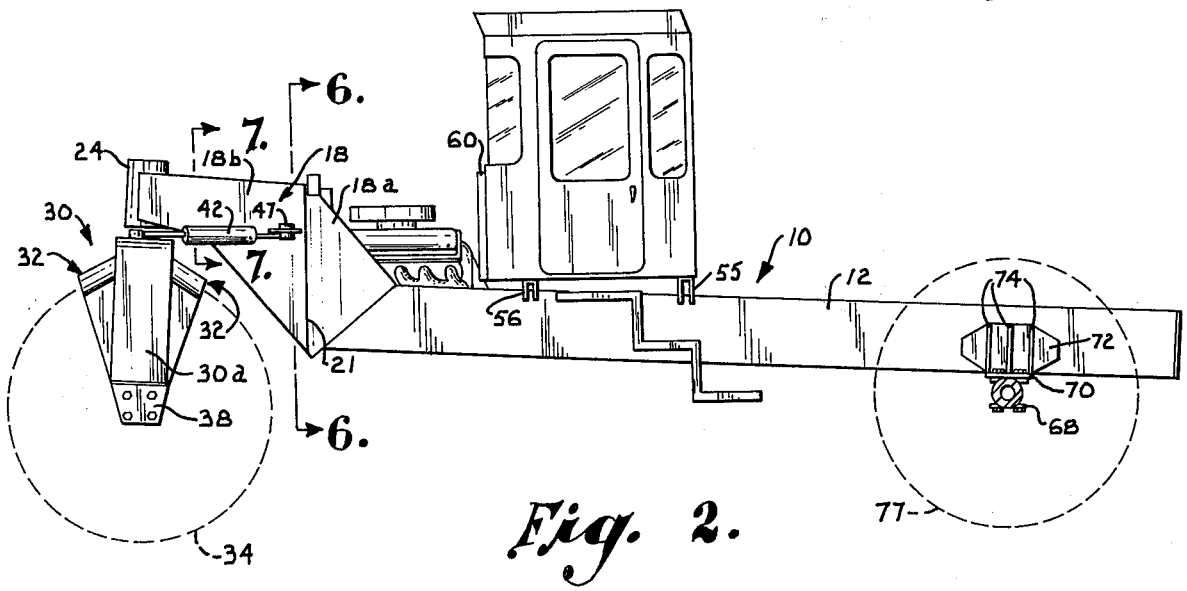

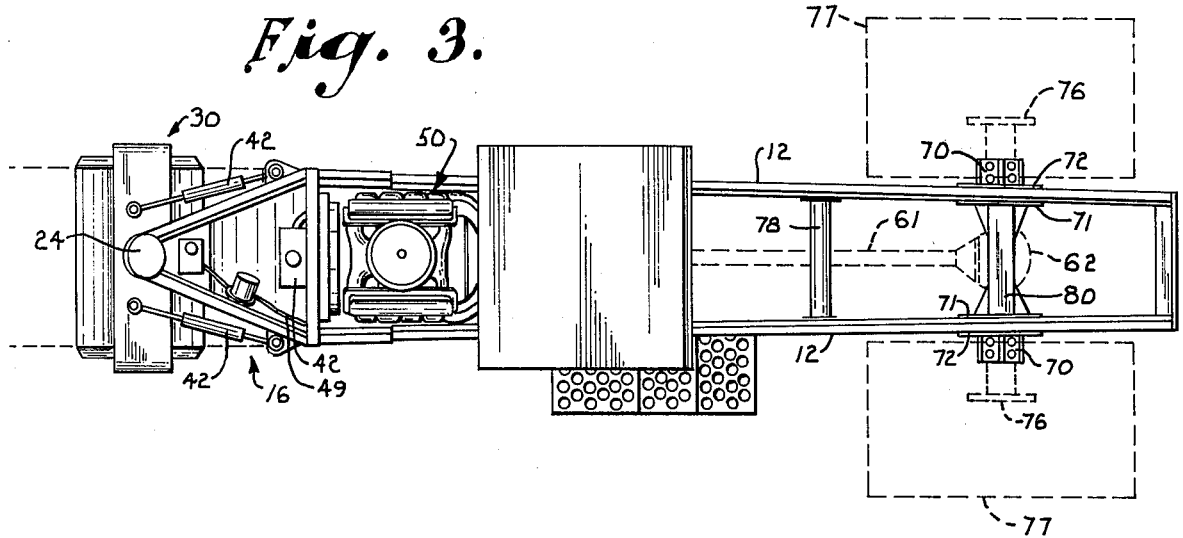
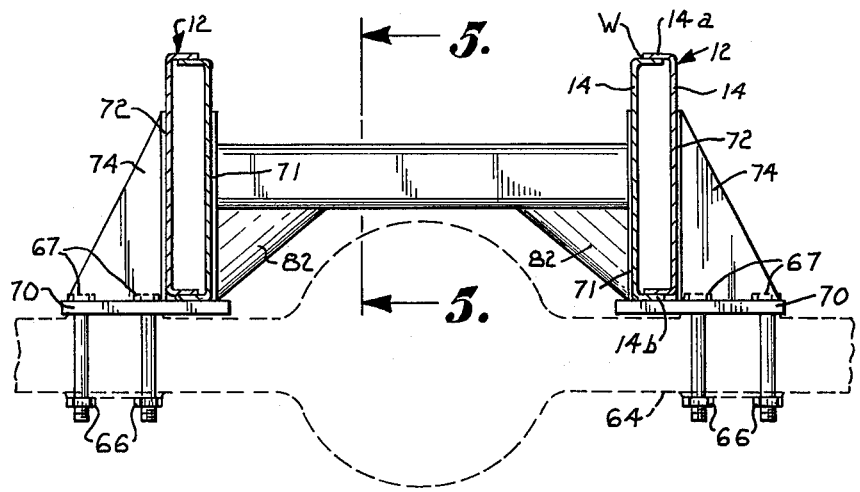
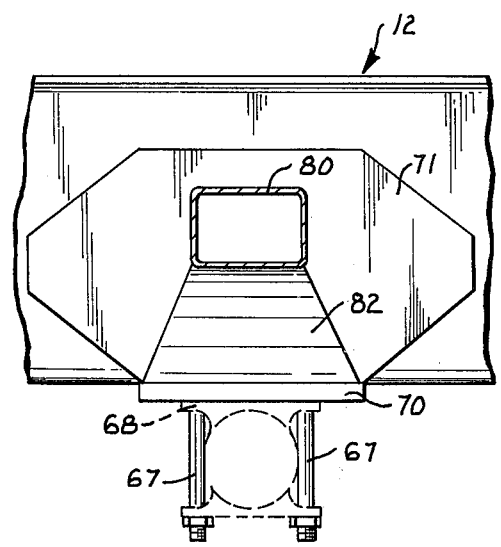

CHASSIS FOR A VEHICLE WITH LARGE DIAMETER SINGLE FRONT WHEEL

BACKGROUND OF THE INVENTION

This invention relates generally to a structurally improved chassis for a self-propelled vehicle having three large diameter "balloon" tires. More particularly, the invention is directed toward providing a frame of suitable configuration and strength for supporting a large engine and for accommodating the heavy loads often carried by vehicles of this type.

In the agriculture industry, application of liquid and solid fertilizers, lime, insecticides, and herbicides has played an increasingly important part in raising the production level and quality of crops. In applying these compounds in the field, it has proven advantageous to utilize a self-propelled vehicle of the tricycle wheel type that is supported on three large diameter balloon tires which produce a low soil loading effect on the field. This type of vehicle is well suited for carrying the required load, while being easily maneuverable on muddy or soft fields without rutting or gouging tracks which later promote soil erosion and similar undersirable effects.

Although the use of such equipment for the recited purpose is already practiced, some problems have been encountered. It is desirable to supply such vehicles with a relatively large engine in order to carry heavy loads through often soft fields; however, a problem has arisen in providing an economical frame structure that will support such an engine in a manner to provide the vehicle with a low profile and practical width and frame clearance at the rear wheels.

There is thus a need in the art to provide a low profile, economically produced chassis having structural strength to support the engine and the heavy loads carried by the vehicle. One of the primary goals of this invention is to fulfill that need.

More specifically, an object of our invention is to provide a structurally strong, economically produced low profile chassis for a vehicle having three oversized tires.

Another object of the invention is to provide a vehicle chassis of the character described that has a low profile, high strength front frame portion for mounting the single front tire and associated steering means.

Yet another object of the invention is to provide a vehicle frame of the character described that is broad enough to house a relatively large engine, while presenting a relatively narrow rear wheel span with sufficient clearance between the wheels and frame to prevent clogging with mud.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a perspective view of a vehicle embodying a preferred form of the invention, the tank or box in which materials are carried not being shown;

FIG. 2 is a side elevational view of the vehicle shown in FIG. 1, the tires being illustrated in broken lines and the engine hood removed;

FIG. 3 is a top plan view of the vehicle shown in FIG. 2, the front screen and hood being removed;

FIG. 4 is an enlarged fragmentary sectional view taken generally along line 4—4 of FIG. 3 in the direction of the arrows, the rear axle and differential being shown in broken lines;

FIG. 5 is a sectional view taken generally along line 5—5 of FIG. 4 in the direction of the arrows;

FIG. 6 is a sectional view taken generally along lines 6—6 of FIG. 5 in the direction of the arrows; and FIG. 7 is a sectional view taken along line 7—7 of FIG. 5 in the direction of the arrows.

Referring now to the drawings in more detail, reference numeral 10 generally designates the main frame of the chassis. Frame 10 comprises two elongate side rails 12 disposed on opposite sides of the vehicle. As is most clearly seen in FIG. 4, side rails 12 are constructed by welding together two uniform C-shaped channel sections 14 with their open sides confronting one another and their upper flanges 14a and lower flanges 14b overlapping to form a box beam type structure. The welds are fill welds as indicated at W, being located at the tips of the flanges 14a, 14b and running along the channels.

The side rails 12 of the chassis are so connected and oriented that rather than being parallel, as in the conventional construction, they diverge from one another in the direction from the rear of the vehicle toward the front. This is best seen in FIG. 3. In the preferred embodiment, the spacing of the rails is approximately 32 inches (outside face to outside face) at the rearward tips and 41 inches at the forward tips. The channels are 2¼ inches × 16 inches, providing each rail with an overall thickness of 3 inches, which means that at the forward end, the inside spacing between the rails is approximately 34 inches. The side rails are also set at an angle with the horizontal, being upwardly inclined from back to front and at an angle of approximately 3°.

The forward ends of side rails 12 are joined to a special front frame portion 16, which is generally V-shaped in plan and includes a pair of side sections 18, a front plate 20, and a forward bottom plate 22 (See FIG. 7). Each side section 18 has a plate-like rear portion 18a and a forwardly tapering beam-like portion 18b. The portions 18b are preferably constructed by overlappingly welding together two channel sections in a manner similar to that described in connection with the construction of side rails 12.

As illustrated in FIG. 2, the side sections 18a, being of greater depth than side rails 12, overlap the forward portions of the respective side rails and extend forwardly and upwardly therefrom. Each side section 18 is bent inwardly about a substantially vertical axis (as at 21) at an angle of approximately 20° relative to the side sections 18a, the two beam-like forward portions 18b gradually approaching one another as they extend forwardly. Front plate 20 is joined to the undersides of portions 18b, and the generally triangular bottom plate 22 continues forwardly of front plate 20 and is disposed beneath the foremost parts of the portions 18b. The joints between the foregoing components are preferably made by continuous welds.

A vertical bearing 24 is carried on front frame portion 16 between the forward ends of the beam-like portions 18b. Bearing 24 rotatably receives a substantially upright pin 26, which is secured to and extends upwardly from a front wheel yoke assembly 30. The bearing 24 is a combined thrust and rotary bearing and may be of any conventional type that permits free turning of assembly 30 about the axis of pin 26.

Yoke assembly 30 comprises a pair of side panels 30a and a top panel 30b to which pin 26 is secured. Fore and aft hood members 32 are carried on yoke 30, each hood member 32 comprising triangular sides 32a and a bent top portion 32b. The large diameter, wide tread front tire 34 is mounted to front axle 36 within the yoke assembly in a conventional manner. A pair of reinforcing plates 38 and 40 provide a firm support for the front wheel assembly.

Steering of the front wheel is controlled by the operation of a pair of hydraulic cylinders 42, which have pistons 44 pivoted to yoke 30 on either side of pin 26, as at 45. Cylinders 42 are pivotally mounted to the respective brackets 46 by suitable couplings 47, brackets 46 being secured to side panels 18 in outward extension therefrom. The hydraulic system for cylinders 42 comprises a fluid reservoir 48, a hydraulic line 49, and a fluid pump (not shown). The flow of hydraulic fluid to and from the cylinders is controlled by suitable valves responsive to the operation of the steering wheel, but the details of the hydraulic system do not play a part in the invention and will not be described in further detail.

A conventional internal combustion engine 50 is mounted between the forward portions of side rails 12 on appropriate motor mounts (not shown). An expanded metal screen 52 covers the open top of front frame 16, allowing air to enter and be channeled through the frame and through the radiator 53 (FIG. 6) for cooling purposes. The operator's cab 54 is mounted behind the engine on cab mounts 55 and 56, and an engine hood 58 covers the engine, seating on the cross member 59 which ties the side sections 18 together and the cab extension 60.

A conventional transmission (not shown) connects the engine with a drive shaft 61 to transmit power through a conventional differential 62 to the rear axle 64. Rear axle 64 is mounted to the underside of the frame by sets of nuts 66 and bolts 67, which firmly secure a pair of flanged mounting brackets 68 to respective mounting plates 70. Plates 70 in turn are secured (as by welding) to sets of octagonal plates 71 and 72. Plates 71 and 72 are secured flushly upon the inward and outward surfaces, respectively, of side rails 12, the sets of outwardly extending triangular braces 74 providing additional support for the mounting of axle 64. The rear axle carries wheel mounts 76 on which the rear tires 77 are conventionally mounted. Like front tire 34, the rear tires 77 are of the oversize balloon variety having a low soil compaction effect.

As earlier described and as shown by FIG. 3, side rails 12 become progressively closer together as they extend rearwardly, giving frame 10 a tapered nature. At appropriate intervals along their lengths, side rails 12 are joined together by tubular cross beams or struts, as by the intermediate strut 78 and rear strut 79. Another structural cross member in the form of tube 80 extends between side rails 12 at a location directly above rear axle 64. As seen in FIGS. 4 and 5, cross member 80 is connected to the octagonal plates 71 disposed flushly with the inward surface of side rails 12, the support braces 82 assisting in the support of the cross member.

It should be noted that the tapered nature of frame 10 allows for a relatively narrow span between the wide tread rear wheels, while providing plenty of width for a large engine to be mounted between the forward portions of the side rails. This structural configuration permits a powerful vehicle to have adequate clearance for passing through areas of reduced width, such as gates and the like.

It is also pointed out that the stress imposed upon front frame portion 16 by any load carried on the vehicle is applied to the high strength beam-like side portions 18. Since the axes 21 about which sides 18 approach one another are not located at junctions between different frame members, but instead extend across the thick beam sections 18a, the areas near the axes 21 exhibit good structural characteristics. The gradual approach of sides 18 toward one another also provides an inherently stronger structure than if the sides 18 were to be abruptly set in from side rails 12 to form a narrow neck-like portion.

From the foregoing it will be seen that this invention is one well adapted to attain all the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. A chassis for a vehicle having a single front tire, said chassis comprising:
   a pair of spaced apart elongate linear frame members extending along a major portion of the length of said chassis and diverging from one another in a gradual manner from the rear of the chassis toward the front, said frame members being sloped gradually upwardly relative to horizontal from the rear of the chassis toward the front;
   a rear axle secured to said elongate frame members toward the rearward portion thereof, said rear axle rotatably carrying a pair of rear wheels outwardly of the respective frame members;
   a front chassis portion having opposite beam-like sides greater in cross sectional area than said elongate frame members, said sides being secured to the forward portions of said elongate frame members in forward and upward extension therefrom with the rearward section of each side being substantially coplanar with the corresponding frame member for a significant distance, said sides being bent toward one another at the forward ends of said rearward sections about generally vertical axes spaced forwardly of the junction of said sides with said elongate frame members and terminating in substantially horizontal arm portions, said arm portions gradually approaching one another as they extend forwardly;
   an engine housing between the forward end portions of said elongate frame members and behind said vertical axes;
   a wheel yoke positioned beneath said arm portions and carrying said front tire; and
   means for pivotally connecting said wheel yoke with said arm portions near the forward ends thereof.

2. The combination of claim 1, wherein each side of said front portion comprises a pair of oppositely oriented channels secured together, each flange portion of one of said channels overlapping the corresponding flange portion of the other of said channels.

3. The chassis as in claim 2, wherein the oppositely oriented channels of said sides present openings in the rearward ends thereof, the forward portions of said elongate frame members being received in said openings and being secured to the respective sides with the sides overlapping said frame members.

4. The combination of claim 1, each arm portion comprising a pair of oppositely oriented channel sections, each flange portion of one of said channels overlapping the corresponding flange portion of the other of said channels.

5. The combination of claim 1, including at least one tubular strut extending between and secured at its opposite ends to the respective frame members.

6. The chassis as in claim 1, the angle of upward slope of said linear frame members being approximately 3°.

\* \* \* \* \*